US012104760B2

(12) United States Patent
Seo et al.

(10) Patent No.: US 12,104,760 B2
(45) Date of Patent: Oct. 1, 2024

(54) LIGHT EMITTING MODULE AND LAMP FOR VEHICLE INCLUDING THE SAME

(71) Applicant: SL Corporation, Daegu (KR)

(72) Inventors: Taeseok Seo, Gyeongsan-si (KR); Hanmyung Lee, Gyeongsan-si (KR); Hyo-Kyoung Kim, Gyeongsan-si (KR); Jae Ik Lee, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/872,027

(22) Filed: Jul. 25, 2022

(65) Prior Publication Data

US 2023/0060919 A1 Mar. 2, 2023

(30) Foreign Application Priority Data

Aug. 31, 2021 (KR) ........................ 10-2021-0115882

(51) Int. Cl.

| | |
|---|---|
| ***F21S 41/176*** | (2018.01) |
| ***F21S 41/20*** | (2018.01) |
| ***F21S 41/24*** | (2018.01) |
| ***F21S 43/16*** | (2018.01) |

(52) U.S. Cl.

CPC ........... *F21S 41/285* (2018.01); *F21S 41/176* (2018.01); *F21S 41/24* (2018.01); *F21S 43/16* (2018.01)

(58) Field of Classification Search

CPC ................................ F21S 41/176; F21S 43/16

See application file for complete search history.

(56) References Cited

U.S. PATENT DOCUMENTS

2010/0259190 A1* 10/2010 Aikala .................. H01L 33/507 257/E33.061
2015/0085467 A1* 3/2015 Tsumori ................ F21S 43/255 362/84

* cited by examiner

*Primary Examiner* — Sean P Gramling

(74) *Attorney, Agent, or Firm* — United One Law Group LLC; Kongsik Kim; Jhongwoo Peck

(57) ABSTRACT

A light emitting module includes at least one light source that generates a first light having a first wavelength region, and a wavelength converter that is excited by the first light and generates a second light having a second wavelength region. The wavelength converter includes a wavelength converting material that is excited by the first light to generate a third light having a third wavelength region, and in the second light, the first light and the third light are mixed at predetermined ratios.

19 Claims, 14 Drawing Sheets

LIGHT EMITTING MODULE AND LAMP FOR VEHICLE INCLUDING THE SAME

CROSS-REFERENCE TO RELATED APPLICATION(S)

This application claims priority from Korean Patent Application No. 10-2021-0115882 filed on Aug. 31, 2021, which application is incorporated herein by reference in its entirety.

BACKGROUND

1. Technical Field

The present disclosure relates to a light emitting module and a vehicle lamp including the same, and more particularly, to a light emitting module capable of reducing a required electric current while improving light efficiency and a vehicle lamp including the same.

2. Description of the Related Art

In general, a vehicle is provided with various types of lamps having an illumination function for easily viewing an object located around the vehicle during low-light conditions (e.g., night-time driving) and a signaling function for notifying other vehicles or road users of the driving state of the vehicle.

For example, headlamps and fog lamps are mainly for the purpose of illumination, and turn signal lamps, tail lamps, brake lamps, etc. are mainly for the purpose of signaling. The installation standards and specifications for the lamps are stipulated by law such that each lamp fully functions.

Recently, LEDs are being used as light sources for vehicle lamps. Typically, LEDs have a color temperature of about 5500K, which is close to sunlight, and therefore, LEDs can minimize human eye fatigue, increase design freedom, and provide economical advantages due to semi-permanent lifespan.

When an LED is used as a light source for a vehicle lamp, the most vulnerable factor is the temperature, and as a large amount of light is required, the electrical current applied to the LED increases, which emits high temperature heat, and the high temperature heat reduces the light emitting performance of the LED.

Accordingly, there is a need for a method to increase the amount of light generated from the LED while reducing the required electric current to improve the light efficiency and to reduce the degradation of light emitting performance due to high temperature heat.

SUMMARY

The present disclosure is devised to solve the above problems, and to provide a light emitting module that reduces the electric current required to reach the target light amount to prevent deterioration of light emitting performance due to high temperature heat while improving light efficiency, and a vehicle lamp including the same. The objects of the present disclosure are not limited to the objects mentioned above, and other objects not mentioned will be clearly understood by those skilled in the art from the following description.

According to an aspect of the present disclosure, a light emitting module may include at least one light source that generates a first light having a first wavelength region, and a wavelength converter that is excited by the first light and generates a second light having a second wavelength region. In particular, the wavelength converter may include a wavelength converting material that is excited by the first light to generate a third light having a third wavelength region, and in the second light, the first light and the third light may be mixed at predetermined ratios.

The first light may be a blue light having a peak wavelength of about 400 nm to about 480 nm, and the third light may be a red light having a peak wavelength of about 620 nm to about 670 nm. The second light may have a peak wavelength of about 400 nm to about 480 nm and about 620 nm to about 670 nm, and a color coordinate (x, y) of the second light in a color coordinate system may be in a range of $0.4679 \leq x \leq 0.6602$ and $0.1940 \leq y \leq 0.3532$.

The wavelength converter may transmit a portion of the first light. The predetermined ratios of the first light and the third light to the second light may be determined based on at least one of a thickness of the wavelength converter or an amount of the wavelength converting material included in the wavelength converter. For example, the predetermined ratio of the first light to the second light may be about 2% to about 20%. For example, the thickness of the wavelength converter may be equal to or less than about 400 μm. Particularly, in response to the thickness of the wavelength converter being equal to or greater than about 300 μm, the predetermined ratio of the first light to the second light may be about 2% to about 12%.

According to another aspect of the present disclosure, a lamp for a vehicle may include a light emitting module that generates light, and an optical module that makes a portion of a wavelength region of the light generated from the light emitting module have different transmittance from another portion of the wavelength region. Further, the light emitting module may include at least one light source that generates a first light having a first wavelength region, and a wavelength converter that is excited by the first light and generates a second light having a second wavelength region. In particular, the wavelength converter may include a wavelength converting material that is excited by the first light to generate a third light having a third wavelength region, and in the second light, the first light and the third light may be mixed at predetermined ratios.

The first light may be a blue light having a peak wavelength of about 400 nm to about 480 nm, and the third light may be a red light having a peak wavelength of about 620 nm to about 670 nm. The predetermined ratio of the first light to the second light may be determined based on a thickness of the wavelength converter, and the wavelength converter may transmit a portion of the first light so that the predetermined ratio of the first light to the second light is about 2% to about 20%. For example, the thickness of the wavelength converter may be equal to or less than about 400 μm. In response to the thickness of the wavelength converter being equal to or greater than about 300 μm, the predetermined ratio of the first light to the second light may be about 2% to about 12%.

The optical module may be made of a resin material with a red pigment added. The optical module may be formed to have different light transmittances with respect to two or more different wavelength regions. The optical module may be formed to have different light transmittances with respect to three or more different wavelength regions, and the optical module may be formed so that a transmittance of one wavelength region is greater than a sum of light transmittances of other wavelength regions.

The optical module may have a light transmittance equal to or less than about 1% with respect to a short wavelength region of about 380 nm to about 560 nm, and may have a light transmittance equal to or greater than about 91% with respect to a long wavelength region of about 650 nm to about 780 nm. Further, a light transmittance of a medium wavelength region between the short wavelength region and the long wavelength region may increase as a wavelength increases. Further, the optical module may have a thickness of about 2.8 mm to about 5.5 mm when measured between an incident surface and an emitting surface thereof.

A light guide module may be disposed between the light emitting module and the optical module, and the light guide module may be arranged so that an incident surface thereof faces the light emitting module and an emitting surface thereof faces the optical module.

Among the light generated from the light emitting module, a light that passes through the optical module may have a dominant wavelength region of about 615 nm to about 635 nm.

Further, the second light may have a color coordinate (x, y) in a color coordinate system within a range of $0.4679 \le x \le 0.6602$ and $0.1940 \le y \le 0.3532$, and the optical module may transmit light having a color coordinate (x, y) in the color coordinate system within a range of $0.6570 \le x \le 0.7340$ and $0.0263 \le y \le 0.3350$.

According to the light emitting module of the present disclosure as described above and a vehicle lamp including the same, the following advantages can be achieved. Since the wavelength converter transmits the light generated from at least one light source to improve the efficiency of the wavelength converter, an electric current required to reach a target light amount may be reduced, thereby improving light efficiency.

Effects of the present disclosure are not limited to the effects mentioned above, and other effects not mentioned will be clearly understood by those skilled in the art from the description of the claims.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
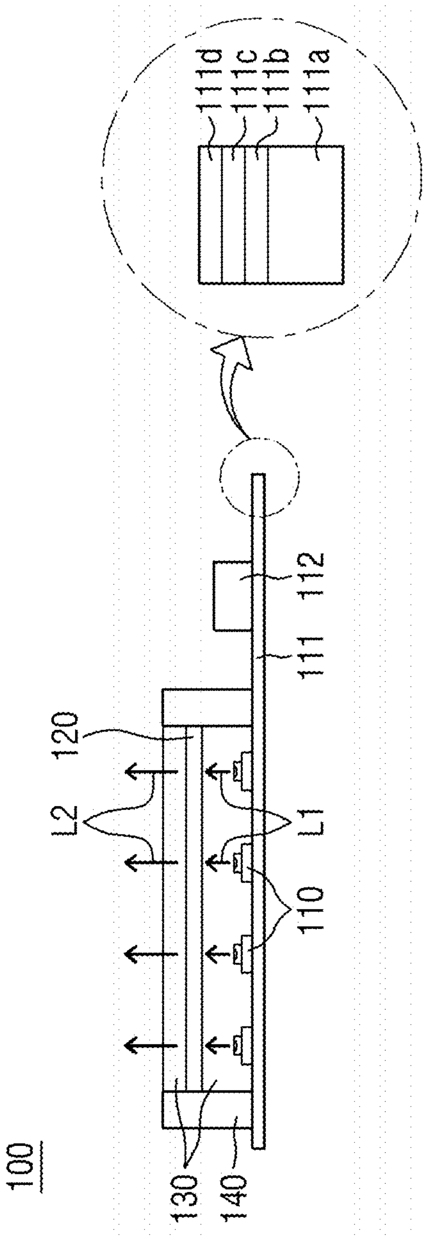
FIG. 1 is a schematic diagram showing a light emitting module according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described with reference to the drawings for describing a light emitting module and a vehicle lamp including the same according to exemplary embodiments of the present disclosure.

Figure 2:
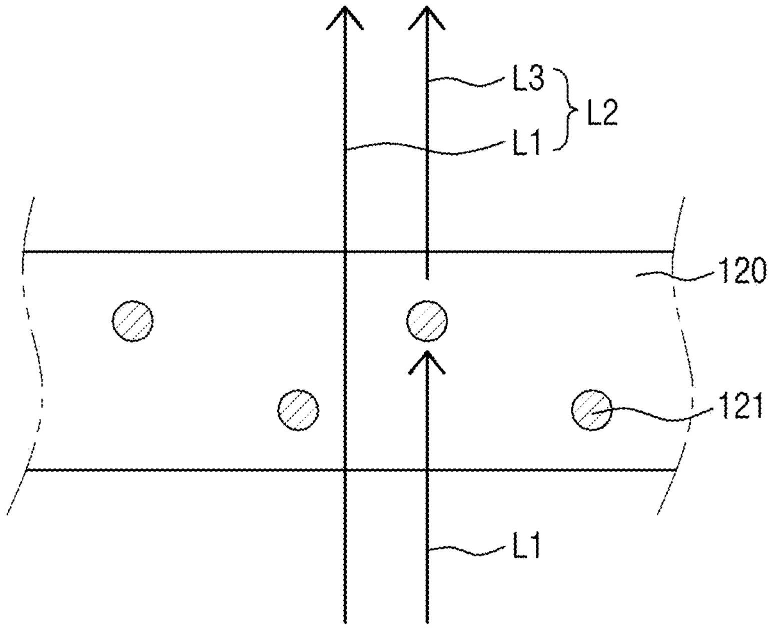
FIG. 2 is a schematic diagram illustrating light generated from a wavelength converter according to an exemplary embodiment of the present disclosure.

FIG. 1 is a schematic diagram illustrating a light emitting module according to an exemplary embodiment of the present disclosure, and FIG. 2 is a schematic diagram illustrating light generated from a wavelength converter according to an exemplary embodiment of the present disclosure. Referring to FIGS. 1 and 2, the light emitting module 100 according to an exemplary embodiment of the present disclosure may include at least one light source 110 and a wavelength converter 120.

In an exemplary embodiment of the present disclosure, for illustration purposes, an example in which the light emitting module 100 generates light for a lamp having a signaling function that can inform pedestrians or surrounding vehicles of the driving state of the vehicle, such as a tail lamp, a brake lamp, a turn signal lamp, a backup lamp, and the like is described. However, the present disclosure is not limited thereto, and the light emitting module 100 of the present disclosure may generate light for various lamps installed in a vehicle.

The at least one light source 110 may generate a first light L1 having a first wavelength region, and in an exemplary embodiment of the present disclosure, an example in which a blue light having a peak wavelength (i.e., peak vacuum wavelength) of about 400 nm to about 480 nm is generated from the at least one light source 110 as the first light is described.

In particular, the physical quantity for light may be defined as flux, and in the present disclosure, it may refer to the radiation flux that is measured with a radiometer, rather than the luminous flux measured with a photometer. The description that the peak wavelength of the first light L1 is about 400 nm to about 480 nm may indicate that the light quantity of the first light L1 may be obtained by summing the radiation flux in a range of about 380 nm to about 520 nm.

The at least one light source 110 may be installed on a substrate 111, and various parts such as a connector 112 for power supply or control of the at least one light source 110 and the like may also be installed together on the substrate 111.

The at least one light source 110 may have various types of structures such as a flip type, a horizontal type, a vertical type, and the like, and in an exemplary embodiment of the present disclosure, an example in which a material of an InGaN-based structure is used to generate blue light is described. However, the present disclosure is not limited thereto, and the material of the at least one light source 110 may be variously selected based on the color of the light to be generated from the at least one light source 110.

The substrate 111 may include a metal layer 111*a*, a first insulating layer 111*b* formed on the metal layer 111*a*, a wiring layer 111*c* formed on the first insulating layer 111*b*, and a second insulating layer 111*d* formed on the wiring layer 111*c*, etc., and in the exemplary embodiment of the present disclosure, the substrate 111 may be made of a material such as aluminum or FR4. However, the present disclosure is not limited thereto, and the material of the substrate 111 may be varied based on electrical characteristics required for the substrate 111.

In addition, the stacked structure of the substrate 111 is not limited to the above-described example, and the stacked structure of the substrate 111 may be varied depending on design reasons.

The wavelength converter 120 may be excited by the first light L1 generated from the at least one light source 110 and may convert the wavelength to allow the second light L2 having a second wavelength region to be generated. In addition, the light generated from the light emitting module 100 of the present disclosure may be understood as the second light L2 generated from the wavelength converter 120.

Figure 3:
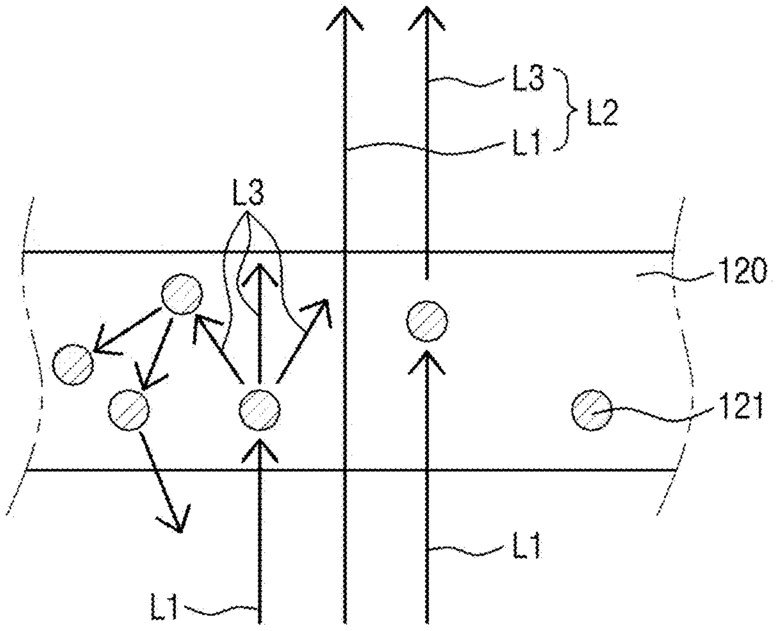
FIG. 3 is a schematic diagram illustrating that light that passes through a wavelength converter depending on a density of a wavelength converting material according to an exemplary embodiment of the present disclosure.

Referring to FIGS. 2 and 3, the wavelength converter 120 may include a wavelength converting material 121 that is excited by the first light L1 to generate the third light L3 having a third wavelength region, and the transmittance of the first light L1 may vary depending on the content (e.g., amount or concentration) of the wavelength converting material 121 included in the wavelength converter 120. Accordingly, when a portion of the first light L1 generated from the at least one light source 110 passes through the wavelength converter 120, the second light L2 generated from the wavelength converter 120 may be understood as a mixture of the first light L1 and the third light L3. Herein, the description that the first wavelength region, the second wavelength region, and the third wavelength region are different from one another may refer to not only different wavelength regions but also different peak wavelengths.

The wavelength converter 120 may be manufactured by mixing the wavelength converting material 121 with a binder that may bind to the wavelength converting material 121. By way of example, an organic binder such as an epoxy-based, silicon-based or an inorganic binder such as glass powder may be used as the binder.

The binder and the wavelength converting material 121 may be configured to have a weight ratio of 1:x (x=0.05 to 1.0), and for example, at least one material among a nitride-based such as $(Ca, Sr, Ba)_2Si_5N_8:Eu^{2+}$, $CaAlSiN_3:Eu^{2+}$, $(Sr, Ca)AlSiN_3:Eu^{2+}$, a sulfide-based such as $(Sr, Ca)S:Eu^{2+}$, and the like, and a fluoride-based such as $K_2SiF_6:Mn^{4+}$ may be used as the wavelength converting material 121 so that it is excited by the first light L1 to generate a red light of the peak wavelength of about 620 nm to about 670 nm as the third light L3. However, the present disclosure is not limited thereto, and the material for the wavelength converting material 121 may be variously selected based on the color of the light to be generated from the wavelength converting material 121.

As discussed above, the physical quantity for light is defined as flux, and it may refer to the radiation flux measured with a radiometer, rather than the luminous flux measured with a photometer. The description that the peak wavelength of the third light L3 is about 620 nm to about 670 nm may indicate that the light amount of the third light L3 may be obtained by summing the radiation flux within a range of about 520 nm to about 780 nm, and accordingly, the radiation flux of the second light L2, in which the first light L1 and the third light L3 are mixed, may be obtained from the radiation flux across a range of about 380 nm to about 780 nm.

In the exemplary embodiment of the present disclosure, the wavelength converting material 121 may be excited by the blue light and may generate red light since the light emitting module 100 of the present disclosure is used in a lamp requiring red light, such as a tail lamp or a brake lamp. However, the present disclosure is not limited thereto, and the wavelength conversion may be configured based on the required color of the lamp for desired function.

In addition, the thickness of the wavelength converter 120 may be determined depending on the light efficiency required by the light emitting module 100 of the present disclosure, and in the exemplary embodiment of the present disclosure, the thickness of the wavelength converter 120 may be about 400 μm or less based on the ratios of the first light L1 and the third light L3 with respect to the second light L2 generated from the wavelength converter 120, as well as based on the light efficiency, or the like. However, the present disclosure is not limited thereto, and the wavelength converter 120 may have a thickness of about 50 μm to about 400 μm so that the wavelength converting material 121 may be included in an appropriate amount.

In the aforementioned wavelength converter 120, the transmittance of the first light L1 may decrease as the amount of the wavelength converting material 121 increases. In other words, depending on the amount of wavelength converting material 121, the second light L2 generated from the wavelength converter 120 may be a mixture of the first light L1 and the third light L3, or may primarily consist of only the third light L3.

In the exemplary embodiment of the present disclosure, the wavelength converter 120 may transmit a portion of the first light L1 so that the second light L2, in which the first light L1 and the third light L3 are mixed, may be generated from the wavelength converter 120. Due to this configuration, the efficiency of the wavelength converter 120 may be increased, such that the amount of light generated from the wavelength converter 120 may be maximized compared to the amount of light generated from the at least one light source 110.

In more details, the wavelength converting material 121 of the wavelength converter 120 may convert the blue light generated from the at least one light source 110 into the red light, but at the same time, may interfere the transmission of the converted red light by, for example, reflecting, scattering, or diffusing the converted red light. In such a case, as the amount of the wavelength converting material 121 increases in the wavelength converter 120, the density of the wavelength converting material 121 distributed per unit area may increase, and thus, while the wavelength converter 120 may convert more blue light into red light, the wavelength converting material 121 may be also more likely to hinder the transmission of the converted red light. Consequently, since the transmission of the converted the red light is interfered by the wavelength converting material 121, the wavelength converter 120 may be heated, and the efficiency thereof may be adversely affected.

Thus, the exemplary embodiment of the present disclosure may improve the efficiency of the wavelength converter 120 by adjusting the amount of the wavelength converting material 121 included in the wavelength converter 120 to an appropriate level so that the wavelength converting material 121 does not act as a factor that interferes with the transmission of the converted red light.

As shown in FIG. 3, if the density of the wavelength converting material 121 is high, it is more likely that a portion of the third light L3, that is, the red light converted by the wavelength converting material 121, is scattered, reflected, or diffused by other adjacent wavelength converting material 121 and thus cannot be transmitted. On the other hand, if the density of the wavelength conversion material 121 is adjusted to an appropriate level, as shown in FIG. 2, the third light L3 converted by the wavelength converting material 121 can be transmitted without being interfered by other adjacent wavelength converting materials 121, and thus the efficiency of the wavelength converter 120 may be improved.

In this case, the efficiency of the wavelength converter 120 may be defined as the ratios of the converted third light L3 and the unconverted first light L1 with respect to the first light L1 incident to the wavelength converter 120 from the at least one light source 110. Alternatively, it may be defined as a weight ratio between the binder and the wavelength converting material 121 or a distribution density per unit area of the wavelength converting material 121.

In addition, in an exemplary embodiment of the present disclosure, allowing the wavelength converter 120 to transmit a portion of the first light L1 may not only improve the efficiency of the wavelength converter 120 but also improve the light efficiency of the lamp, in which the light emitting module 100 of the present disclosure is used, by reducing the electric current required to reach the target light amount in the lamp.

In other words, when the wavelength converter 120 transmits a portion of the first light L1, the overall light efficiency may be increased because the efficiency of the wavelength converter 120 can be improved, and thus the electric current required to reach the target light amount can be reduced.

According to the exemplary embodiment of the present disclosure, the ratio of the first light L1 to the second light L2 may be selected to be about 2% to about 12% in terms of the radiation fluxes. If the ratio of the first light L1 to the second light L2 is less than about 2% or greater than about 12%, at least one of the efficiency of the wavelength converter 120, the required electric current, or the light efficiency may be reduced.

Figure 4:
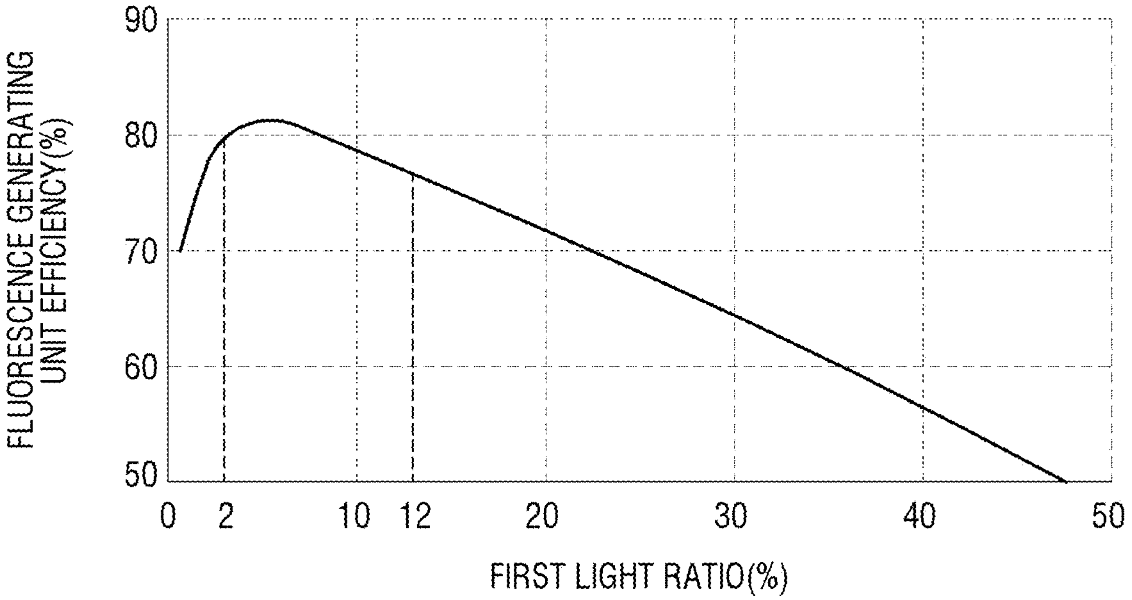
FIG. 4 is a schematic diagram illustrating the efficiency of a wavelength converter with respect to a ratio of a first light to a second light according to an exemplary embodiment of the present disclosure.
Figure 5:
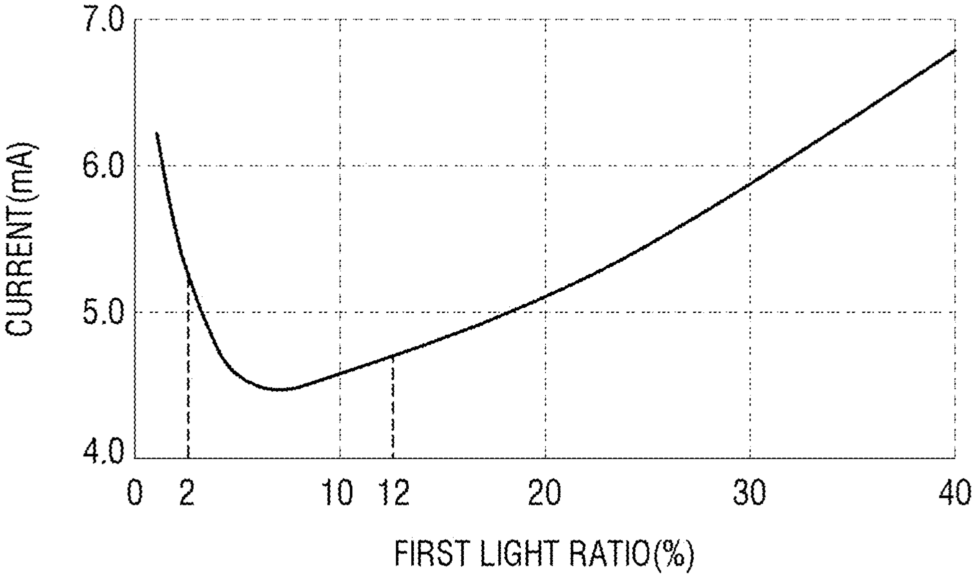
FIG. 5 is a schematic diagram illustrating an electric current required to reach a target light amount with respect to a ratio of a first light to a second light according to an exemplary embodiment of the present disclosure.
Figure 6:
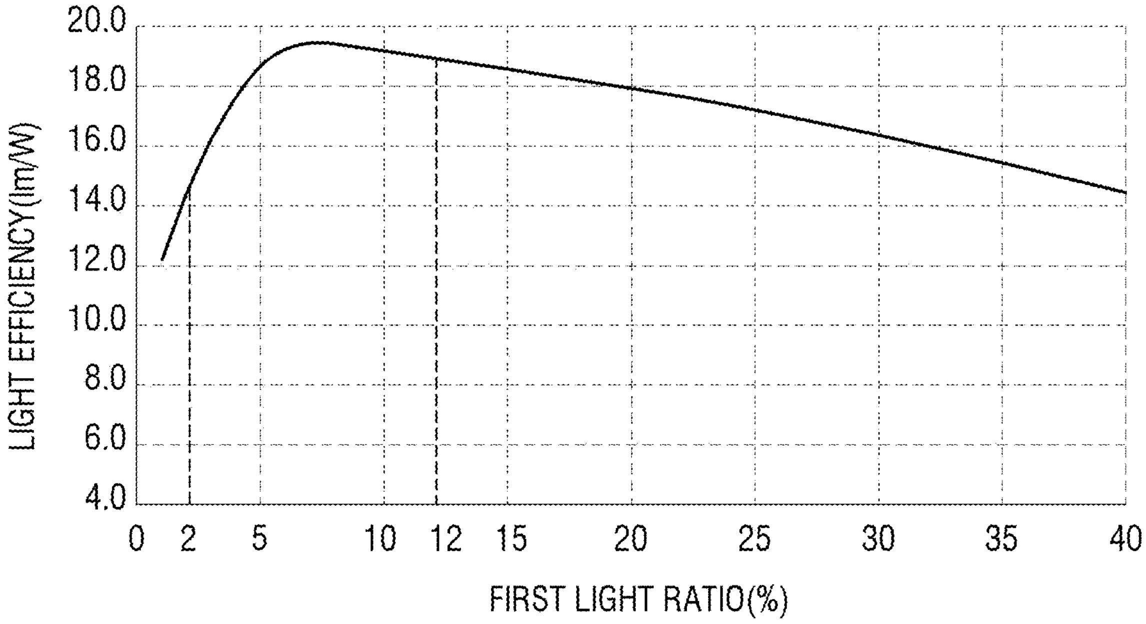
FIG. 6 is a schematic diagram illustrating light efficiency with respect to a ratio of a first light to a second light according to an exemplary embodiment of the present disclosure.

FIG. 4 is a schematic diagram showing the efficiency of the wavelength converter with respect to the fraction of the first light within the second light according to the exemplary embodiment of the present disclosure, FIG. 5 is a schematic diagram showing an electric current required to reach a target light amount with respect to the fraction of the first light within the second light according to the exemplary embodiment of the present disclosure, and FIG. 6 is a schematic diagram showing the overall light efficiency with respect to the fraction of the first light within the second light according to an exemplary embodiment of the present disclosure.

Referring to FIGS. 4 to 6, it can be seen that when the fraction of the first light L1 generated from at least one light source 110 within the second light L2 generated from the wavelength converter 120 according to an exemplary embodiment of the present disclosure is less than about 2% or greater than about 12%, at least one of the efficiency of the wavelength converter 120, the required electric current, or the overall light efficiency is reduced.

Therefore, the fraction of the first light L1 generated from the at least one light source 110 within the second light L2 generated from the wavelength converter 120 may be determined to be about 2% to about 12% since the efficiency of the wavelength converter 120, the required electric current, and the light efficiency can be increased in this range of the fraction of the first light L1 to the second light L2.

According to the present disclosure, in order to make the ratio of the first light L1 to the second light L2 between about 2% and about 12%, the amount of the wavelength conversion material 121 may be adjusted to an appropriate level so that the wavelength conversion material 121 may minimally interfere the converted third light L3 as described above. The ratio of the first light L1 to the second light L2 being less than about 2% may mean that the content of the wavelength converting material 121 is higher than the appropriate level, and in this case, as shown in FIG. 3, the third light L3 converted by the wavelength converting material 121 may be interfered by the adjacent wavelength converting material 121 without being transmitted, so that the efficiency of the wavelength converter 120 may be reduced. In addition, the ratio of the first light L1 to the second light L2 being greater than about 12% may mean that the content of the wavelength converting material 121 is lower than the appropriate level, and in this case, since the third light L3 converted by the wavelength converting material 121 is not sufficient, the electric current required for the amount of light generated from the light emitting module to reach the target light amount increases, so that the light efficiency may be lowered as well.

For example, when the light emitting module 100 of the present disclosure is used for a lamp requiring red light, such as a tail lamp or a brake lamp, the blue light component among the light generated from the light emitting module 100 of the present disclosure may be blocked (e.g., filtered out), and if the amount of the wavelength converting material 121 is lower than the appropriate level, the ratio of the blue light to the light generated from the light emitting module 100 of the present disclosure increases, so that more blue light is blocked, and less red light is transmitted, thereby requiring more electric current in order to reach the overall target light amount, which may reduce light efficiency.

Figure 7:
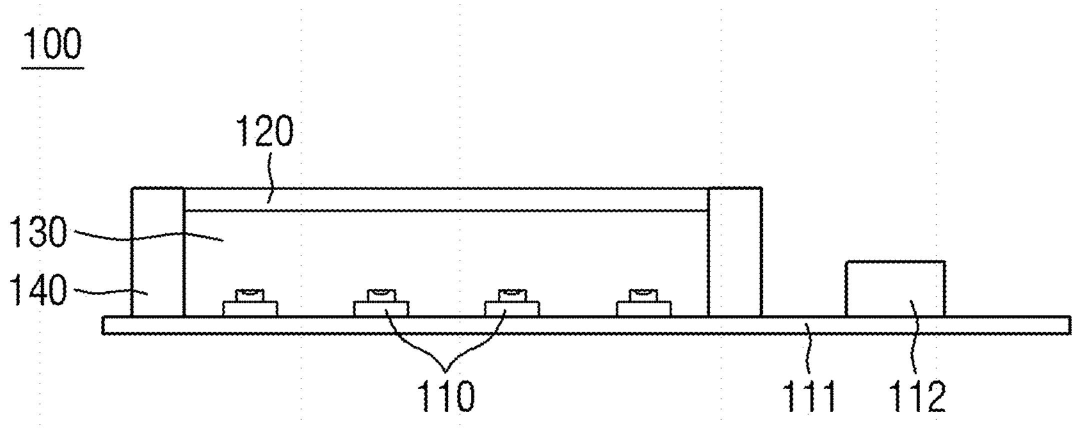
FIG. 7 is a schematic diagram showing a light emitting module according to another exemplary embodiment of the present disclosure.
Figure 8:
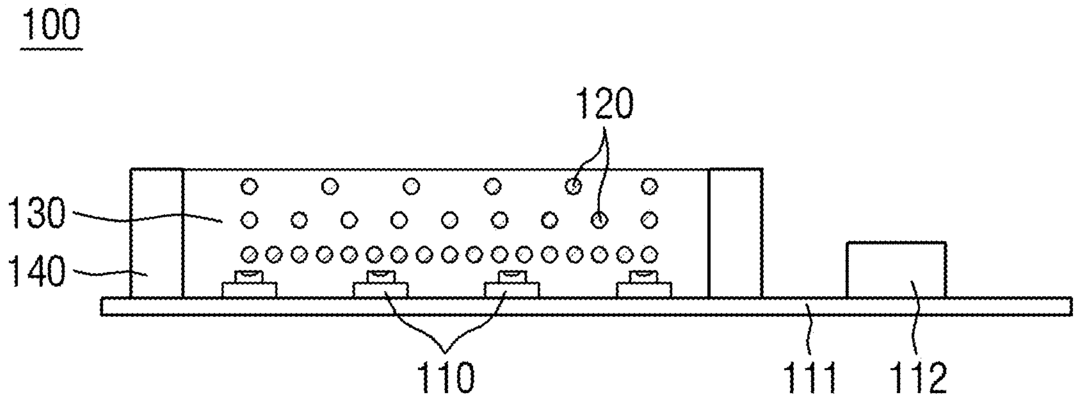
FIG. 8 is a schematic diagram showing a light emitting module according to another exemplary embodiment of the present disclosure.

Further, in the exemplary embodiment of the present disclosure, an example in which the light transmitting layer 130 is disposed on both an incident side and an emitting side of the wavelength converter 120 to diffuse the light so that the light emitting module 100 of the present disclosure can serve as a surface light source, from which light having a substantially uniform brightness is generated across the surface is described. However, this is only an example for helping the understanding, and the present disclosure is not limited thereto. As shown in FIG. 7, the light transmitting layer on the emitting side of the wavelength converter 120 may be omitted, or as shown in FIG. 8, the wavelength converter 120 may be implemented as a molding structure, disposed within the light transmitting layer 130, combining the wavelength converter 120 and the light transmitting layer 130 into effectively a single component.

The light transmitting layer 130 may be formed to have a thickness of about 300 μm to about 2400 μm so that the light generated from the light emitting module 100 of the present disclosure may have substantially uniform brightness as a whole. Further, diffusion agents such as $SiO_2$, $TiO_2$, and the like may be added as necessary.

A partition wall 140 may be formed on at least some of the side surfaces of the aforementioned wavelength converter 120 and the light transmitting layer 130 to reduce or prevent light leakage, and the partition wall 140 may also reduce or prevent light interference with an adjacent light emitting module and may promote a high contrast ratio. However, when light interference with an adjacent light emitting module is not a concern, and a sufficient contrast ratio can be implemented, the partition wall 140 may be omitted.

Further, in the exemplary embodiment of the present disclosure, the reason that the wavelength converter 120 is included in the light emitting module 100 instead of using a light source that intrinsically generates light of a required color is because this configuration with the wavelength converter 120 may provide better heat resistance and thus may perform more consistently even at high temperatures. Thus, the light may exhibit more uniform brightness due to less change in brightness with temperature changes.

On the other hand, a light source that intrinsically generates light of a color required is used, the temperature is increased due to the heat generated as the light is generated, and thus, the performance of the light source rapidly degrades, and the brightness is decreased. However, in the exemplary embodiment of the present disclosure, since the wavelength converter 120 is excited by the light generated from the at least one light source 110 to utilize fluorescence, the brightness change may become minimal even when the temperature is increased due to the heat, so that light of uniform brightness may be generated for an extended period of time.

As described above, the reason that the wavelength converting material 121 that generates red light as the third light L3 is used in the wavelength converter 120 is because the red light is generally required for the tail lamp or the brake lamp. In this case, it may be necessary to block the first light L1 among the second light L2 generated by the wavelength converter 120 since the first light L1 may be blue light.

Figure 9:
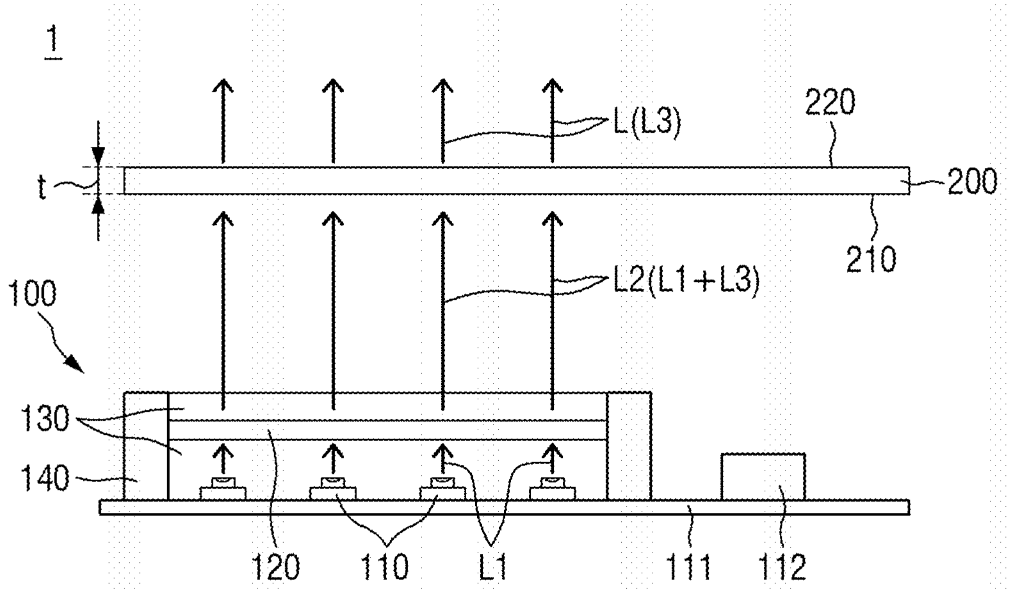
FIG. 9 is a schematic diagram showing a vehicle lamp according to an exemplary embodiment of the present disclosure.

FIG. 9 is a schematic diagram illustrating a vehicle lamp according to an exemplary embodiment of the present disclosure. Referring to FIG. 9, the vehicle lamp 1 according to the exemplary embodiment of the present disclosure may include a light emitting module 100 and an optical module 200. The light emitting module 100 of FIG. 9 may be the same as the one shown in FIG. 1 and described above. The same reference numerals as in the above-described exemplary embodiment will be used, and a detailed description thereof will be omitted.

In the exemplary embodiment of the present disclosure, the optical module 200 may block (e.g., filter out) the first light L1 among the second light L2 that is generated from the light emitting module 100 so that the resulting light L of a required color may be emitted from the vehicle lamp 1 of the present disclosure, whereby the light L emitted from the vehicle lamp 1 of the present disclosure may be primarily composed of the third light L3.

In other words, the optical module 200 may serve as a color filter that transmits red light among the light generated from the light emitting module 100 and blocks blue light. In the exemplary embodiment of the present disclosure, the optical module 200 may be made of a resin material such as polymethyl methacrylate (PMMA) with a red pigment added and may be formed by injection molding.

The optical module 200 may have a thickness (t) of about 2.8 mm to about 5.5 mm when measured between the incident surface 210, on which the light is incident from the light emitting module 100, and the emitting surface 220, from which the light is emitted. If the thickness (t) of the optical module 200 is less than about 2.8 mm, the risk of being damaged by external impact may increase, so that the reliability or manufacturing productivity of the product may be lowered, and if the thickness of the optical module 200 is greater than about 5.5 mm, the light transmittance may be lowered and thus the required amount of light may not be reached.

Figure 10:
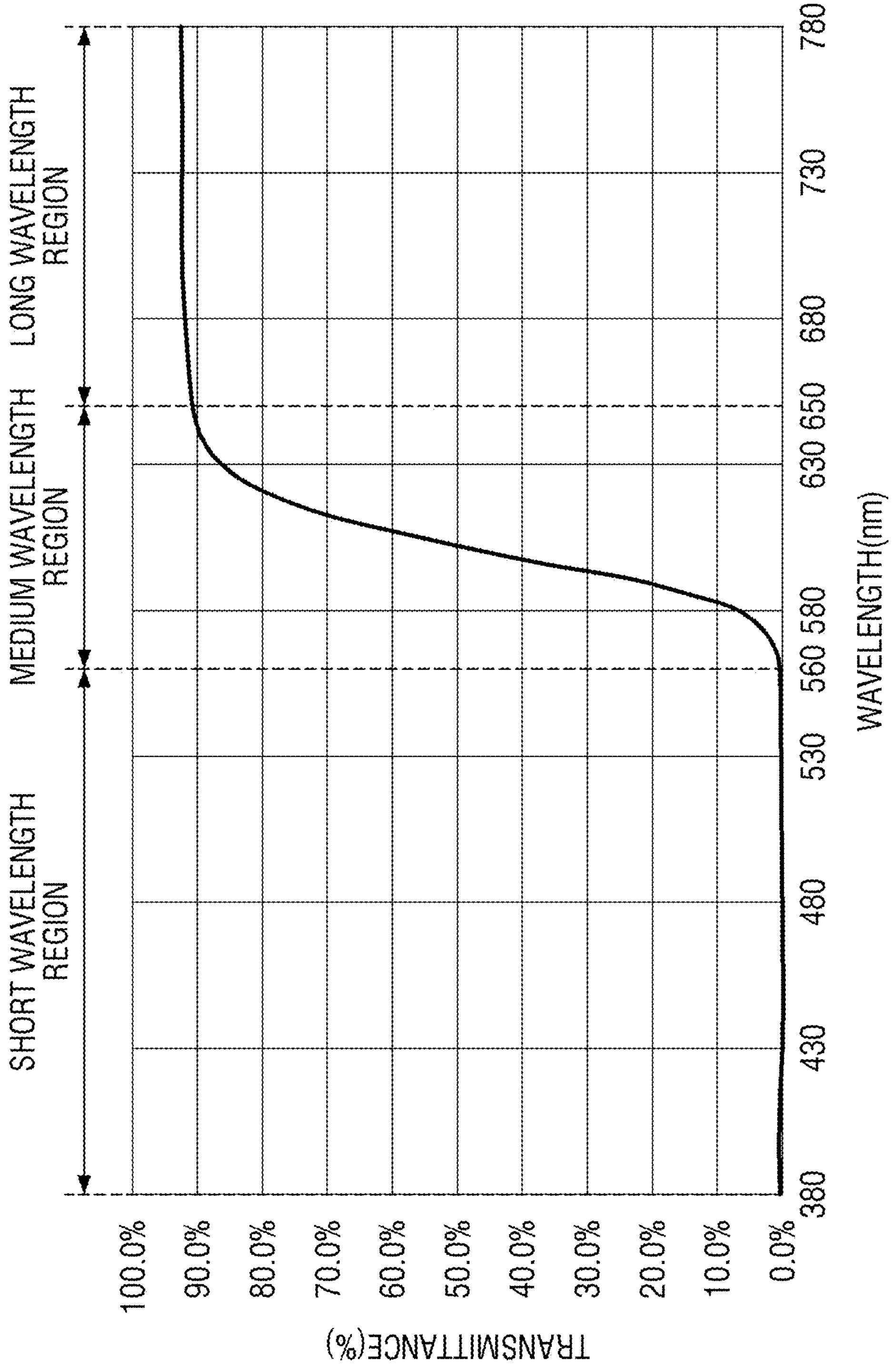
FIG. 10 is a schematic diagram showing transmittance of an optical module according to an exemplary embodiment of the present disclosure.

As shown in FIG. 10, the optical module 200 may have different light transmittance with respect to wavelength, and according to an exemplary embodiment of the present disclosure, the optical module 200 may have a light transmittance of about 91% or more in a long wavelength region of about 650 nm to about 780 nm, and it may have a light transmittance of about 1% or less in a short wavelength region of about 380 nm to about 560 nm. In a medium wavelength region between about 560 nm and about 650 nm, the light transmittance may gradually increase as the wavelength increases, so that it may have a light transmittance from about 1% to about 91%.

In the exemplary embodiment of the present disclosure, an example in which the optical module 200 is formed to have different light transmittance with respect to three wavelength regions is described. However, the present disclosure is not limited thereto, and the optical module 200 may be formed to have different light transmittance with respect to two or more wavelength regions depending on the required color of light in the vehicle lamp 1 of the present disclosure.

In addition, in the exemplary embodiment of the present disclosure, the light transmittance with respect to a wavelength region corresponding to the color required in the vehicle lamp 1 of the present disclosure may be greater than the sum of the light transmittance in the remaining wavelength regions so that light having a wavelength region corresponding to the color required in the vehicle lamp 1 of the present disclosure may be transmitted through the optical module 200.

As described above, the optical module 200 may be formed to have different light transmittance for each wavelength region such that red light may be emitted for the vehicle lamp 1 of the present disclosure to serve a signaling function.

Figure 11:
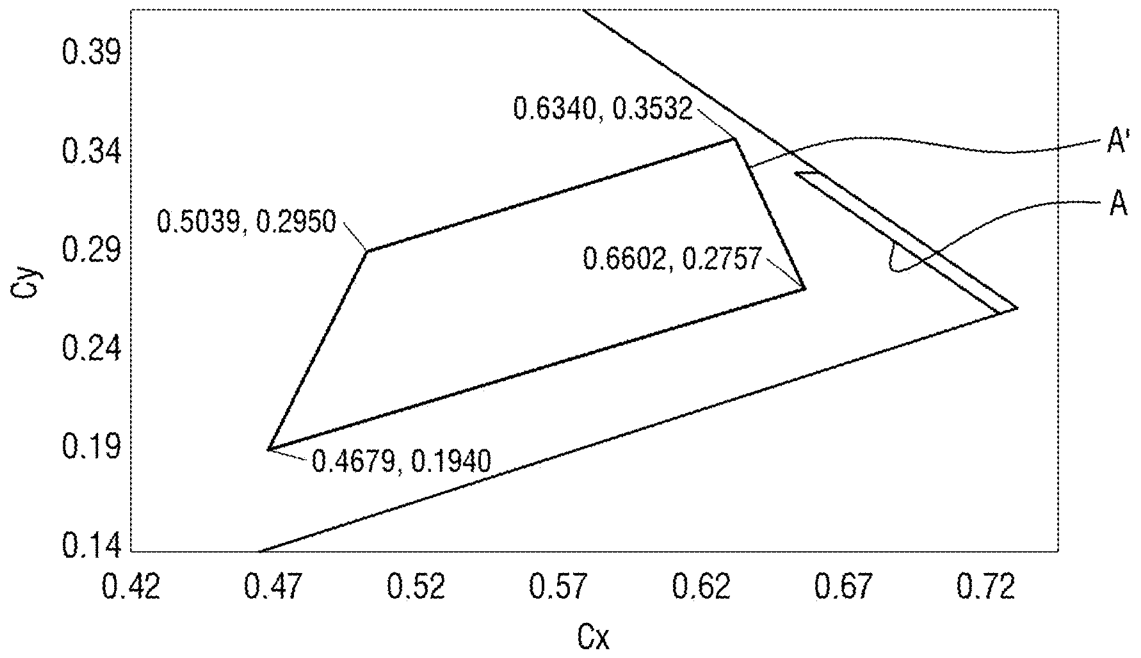
FIG. 11 is a schematic diagram illustrating color coordinates of light generated from a wavelength converter according to an exemplary embodiment of the present disclosure.

In particular, when the vehicle lamp 1 of the present disclosure is used as a tail lamp or a brake lamp, it needs to be included in the setting region A in the color coordinate system shown in FIG. 11 in order to satisfy the regulations for light distribution. However, since the second light L2, which is the light generated from the light emitting module 100, includes the first light L1 and the third light L3, the color coordinates (x, y) are included in the region A' where $0.4679 \leq x \leq 0.6602$ and $0.1940 \leq y \leq 0.3532$. In this case, the color coordinates (x, y) of the second light L2 are out of the setting region A that satisfies the regulations, and instead, the color coordinates (x. y) are $0.6570 \leq x \leq 0.7340$ and $0.0263 \leq y \leq 0.3350$, which fails to satisfy the regulations.

Figure 12:
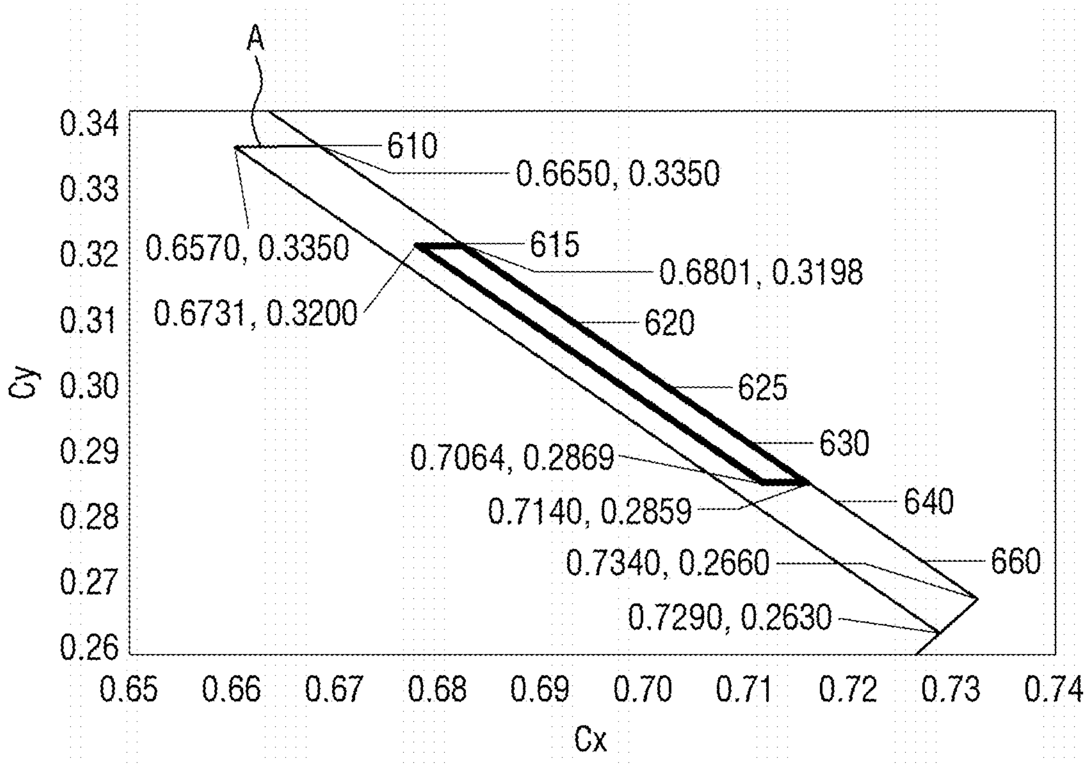
FIG. 12 is a schematic diagram illustrating color coordinates of the light that passes through an optical module according to an exemplary embodiment of the present disclosure.

Therefore, in the exemplary embodiment of the present disclosure, by allowing the optical module 200 to have different light transmittance for each wavelength region as shown in FIG. 10, the color coordinates (x, y) may become $0.6731 \leq x \leq 0.7140$ and $0.2859 \leq y \leq 0.3200$, as shown in FIG. 12, so that light L having a dominant wavelength region of about 615 nm to about 635 nm and having a color purity of about 98% to about 100% may be emitted, and the regulations for light distribution may be satisfied.

Figure 13:
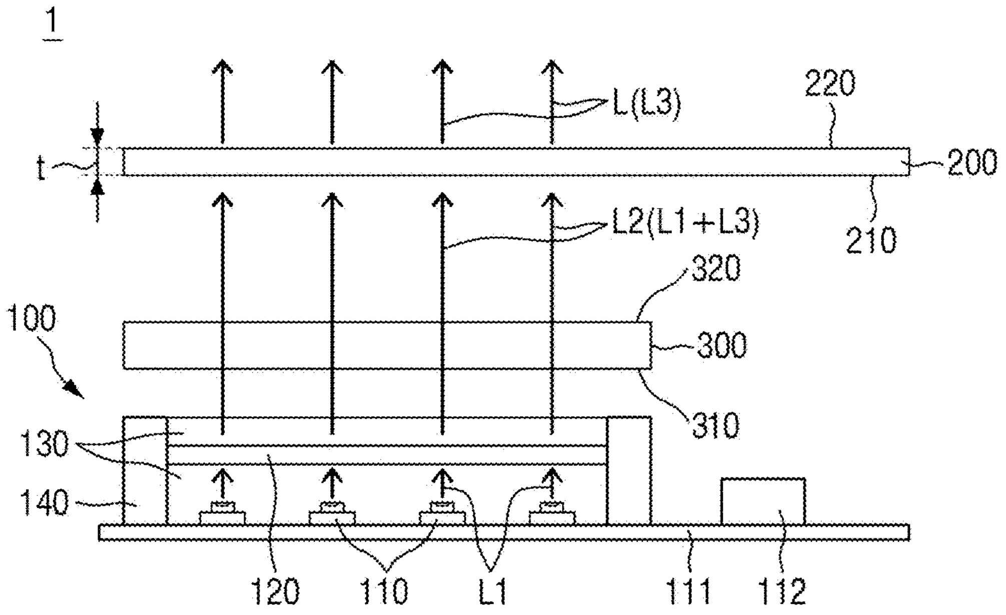
FIG. 13 is a schematic diagram showing a vehicle lamp according to another exemplary embodiment of the present disclosure.

In the above-described vehicle lamp 1 of the present disclosure, the light generated from the light emitting module 100 may be directly incident on the optical module 200. However, the present disclosure is not limited thereto, and as shown in FIG. 13, the light generated from the light emitting module100 may be guided to the optical module 200 through a light guide module 300 disposed between the light emitting module 100 and the optical module 200.

The light guide module 300 may be disposed so that the incident surface 310 thereof faces the light emitting module 100 and the emitting surface 320 thereof faces the optical module 200. Accordingly, the light guide module 300 may not only guide the light generated from the light emitting module 100 to the traveling direction of the light so that it is incident on the optical module 200 with a minimal loss, but may also diffuse the light generated from the light emitting module 100 so that the light generated from the vehicle lamp 1 of the present disclosure may have substantially uniform brightness as a whole.

In an exemplary embodiment of the present disclosure, the optical module 200 may be implemented as an outer lens of the vehicle lamp 1 of the present disclosure, or an inner lens disposed between the light emitting module 100 and the outer lens. However, the present disclosure is not limited thereto. As long as the first light L1 among the second light L2 generated from the light emitting module 100 can be blocked so that the red light required by the vehicle lamp 1 of the present disclosure can be emitted, the position of the optical module 200 may be variously changed.

Meanwhile, in the above-described exemplary embodiments, an example in which the ratio of the first light L1 to the second light L2 is about 2% to about 12% is described. However, this is provided as an example for better understanding of the present disclosure. The ratio of the first light L1 to the second light L2 may be variously selected based on the thickness of the wavelength converter 120 so that the efficiency of the wavelength converter 120, required electric current, and light efficiency may be satisfied.

Figure 14:
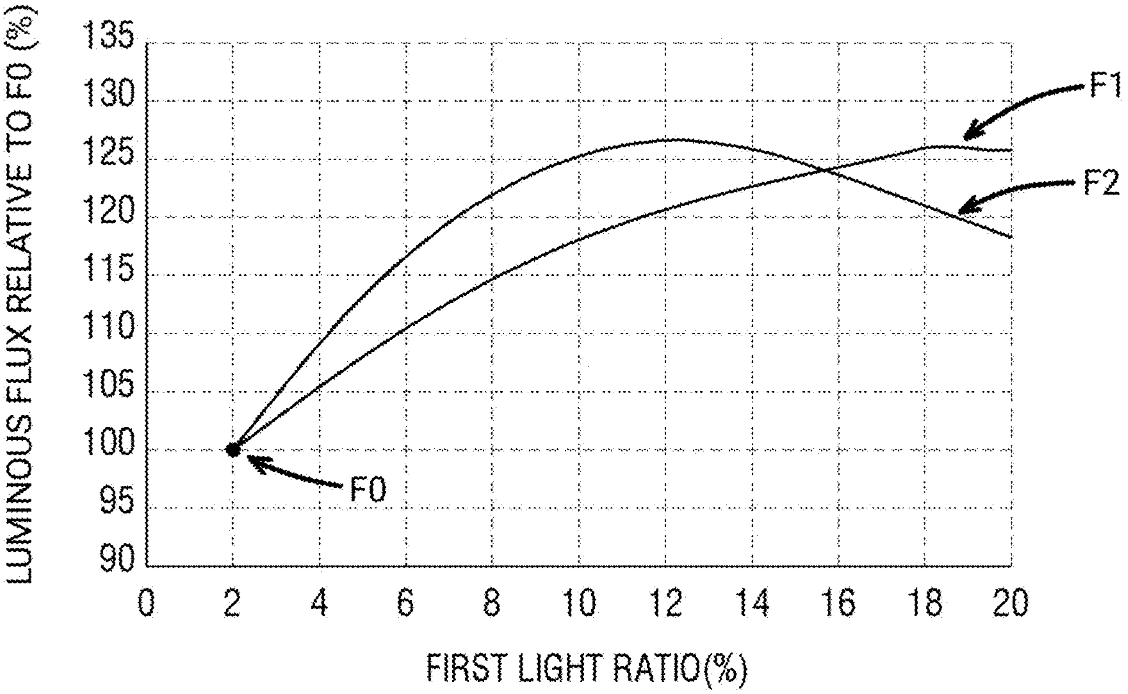
FIG. 14 is a schematic diagram illustrating relative luminous flux curves depending on a thickness of a wavelength converter according to an exemplary embodiment of the present disclosure.

FIG. 14 is a schematic diagram illustrating relative luminous flux curves depending on the thickness of the wavelength converter according to an exemplary embodiment of the present disclosure. Referring to FIG. 14, if the thickness of the wavelength converter 120 is about 400 μm or less (shown as F1 in FIG. 14), the relative luminous flux F1 is increased when the ratio of the first light L1 to the second light L2 is about 2% to about 20%, compared to the case where the first light L1 is not included among the second light L2 by 2% (shown as F0). In this case, all of the efficiency of the wavelength converter 120, the required electric current, and the light efficiency may be increased.

Similar to the above-described exemplary embodiment, the description that the ratio of the first light L1 to the second light L2 is about 2% to about 20% may mean that the amount of the wavelength converting material 121 is adjusted to an appropriate level so that the wavelength converting material 121 does not interfere with the converted third light L3.

When the thickness of the wavelength converter 120 is 300 μm or more (shown as F2 in FIG. 14), which is relatively thicker, it can be seen that the relative luminous flux F2 is increased when the ratio of the first light L1 to the second light L2 is about 2% to about 12%, compared to the case, in which the first light L1 is included among the second light L2 by 2% (F0).

In other words, when the thickness of the wavelength converter 120 is about 400 μm or less, the required efficiency of the wavelength converter 120, the required electric current, and the light efficiency may be satisfied when the ratio of the first light L1 to the second light L2 is about 2% to about 20%. Under this condition, when the thickness of the wavelength converter 120 is about 300 μm or more, which is relatively thick, better efficiency may be exhibited when the ratio of the first light L1 to the second light L2 is about 2% to about 12%. Accordingly, when the thickness of the wavelength converter 120 is about 300 μm to about 400 μm, the efficiency of the wavelength converter 120, required electric current, and light efficiency may be satisfied when the ratio of the first light L1 to the second light L2 is about 2% to about 12% or about 2% to about 20%. FIG. 14 is an example showing the relative luminous flux with respect to the ratio of the first light L1 to the second light L2, based on a reference where the first light L1 is included in the second light L2 by 2% (shown as F0 in FIG. 14).

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle comprising:

at least one light source that generates a first light distribution including a first light component emitted in a first wavelength region;

a wavelength converter that converts the first light distribution into a second light distribution, wherein the wavelength converter includes a wavelength converting material that is excited by the first light component and generates a second light component emitted in a second wavelength region, such that the second light distribution includes the first light component and the second light component mixed at predetermined ratios; and an optical module disposed in front of the wavelength converter to absorb at least a portion of the first light component emitted from the wavelength converter such that the lamp emits light substantially in the second wavelength region, wherein the first light component is a blue light having a peak wavelength of about 400 nm to about 480 nm, and the second light component is a red light having a peak wavelength of about 620 nm to about 670 nm, wherein a fraction of the first light component included in the second light distribution is about 18%, and wherein a thickness of the wavelength converter is equal to or less than 400 μm.

2. The vehicle lamp of claim 1, wherein the optical module is made of a resin material with a red pigment added.

3. The vehicle lamp of claim 1, wherein the optical module is formed to have different light transmittances with respect to two or more different wavelength regions.

4. The vehicle lamp of claim 1, wherein the optical module is formed to have different light transmittances with respect to three or more different wavelength regions, and wherein the optical module is formed so that a transmittance of one wavelength region is greater than a sum of light transmittances of other wavelength regions.

5. The vehicle lamp of claim 1, wherein the optical module has a light transmittance equal to or less than about 1% with respect to a short wavelength region of about 380 nm to about 560 nm, and has a light transmittance equal to or greater than about 91% with respect to a long wavelength region of about 650 nm to about 780 nm, and wherein a light transmittance of the optical module increases in a medium wavelength region between the short wavelength region and the long wavelength region as wavelengths increase.

6. The vehicle lamp of claim 1, wherein the optical module has a thickness of about 2.8 mm to about 5.5 mm when measured between an incident surface and an emitting surface thereof.

7. The vehicle lamp of claim 1, further comprises, a light guide module disposed between the wavelength converter and the optical module, wherein the light guide module is arranged so that an incident surface thereof faces the wavelength converter and an emitting surface thereof faces the optical module.

8. The vehicle lamp of claim 1, wherein a light that passes through the optical module has a dominant wavelength region of about 615 nm to about 635 nm.

9. The vehicle lamp of claim 1, wherein the second light distribution has a color coordinate (x, y) in a color coordinate system within a range of $0.4679 \leq x \leq 0.6602$ and $0.1940 \leq y \leq 0.3532$, and wherein the optical module transmits light having a color coordinate (x, y) in the color coordinate system within a range of $0.6570 \leq x \leq 0.7340$ and $0.0263 \leq y \leq 0.3350$.

10. A lamp for a vehicle comprising:

at least one light source that generates a first light distribution including a first light component emitted in a first wavelength region;

a wavelength converter that converts the first light distribution into a second light distribution, wherein the wavelength converter includes a wavelength converting material that is excited by the first light component and generates a second light component emitted in a second wavelength region, such that the second light distribution includes the first light component and the second light component mixed at predetermined ratios;

an optical module disposed in front of the wavelength converter to absorb at least a portion of the first light component emitted from the wavelength converter such that the lamp emits light substantially in the second wavelength region; and a light transmissive layer, in which the wavelength converter is embedded as a molded structure, wherein the first light component is a blue light having a peak wavelength of about 400 nm to about 480 nm, and the second light component is a red light having a peak wavelength of about 620 nm to about 670 nm, wherein a fraction of the first light component included in the second light distribution is about 12%, and wherein a thickness of the light transmissive layer including the wavelength converter is equal to or greater than 300 μm.

11. The vehicle lamp of claim 10, wherein the optical module is made of a resin material with a red pigment added.

12. The vehicle lamp of claim 10, wherein the optical module is formed to have different light transmittances with respect to two or more different wavelength regions.

13. The vehicle lamp of claim 10, wherein the optical module is formed to have different light transmittances with respect to three or more different wavelength regions, and wherein the optical module is formed so that a transmittance of one wavelength region is greater than a sum of light transmittances of other wavelength regions.

14. The vehicle lamp of claim 10, wherein the optical module has a light transmittance equal to or less than about 1% with respect to a short wavelength region of about 380 nm to about 560 nm, and has a light transmittance equal to or greater than about 91% with respect to a long wavelength region of about 650 nm to about 780 nm, and wherein a light transmittance of the optical module increases in a medium wavelength region between the short wavelength region and the long wavelength region as wavelengths increase.

15. The vehicle lamp of claim 10, wherein the optical module has a thickness of about 2.8 mm to about 5.5 mm when measured between an incident surface and an emitting surface thereof.

16. The vehicle lamp of claim 10, further comprises, a light guide module disposed between the wavelength converter and the optical module, wherein the light guide module is arranged so that an incident surface thereof faces the wavelength converter and an emitting surface thereof faces the optical module.

17. The vehicle lamp of claim 10, wherein a light that passes through the optical module has a dominant wavelength region of about 615 nm to about 635 nm.

18. The vehicle lamp of claim 10, wherein the second light distribution has a color coordinate (x, y) in a color coordinate system within a range of $0.4679 \leq x \leq 0.6602$ and $0.1940 \leq y \leq 0.3532$, and wherein the optical module transmits light having a color coordinate (x, y) in the color coordinate system within a range of $0.6570 \leq x \leq 0.7340$ and $0.0263 \leq y \leq 0.3350$.

19. The vehicle lamp of claim 10, wherein the light transmissive layer includes a light diffusion agent.

* * * * *